United States Patent
Sato

(10) Patent No.: US 6,894,718 B2
(45) Date of Patent: May 17, 2005

(54) CONTINUAL-IMAGE PROCESSING DEVICE FOR PRINTING OR DISPLAYING IMAGES

(75) Inventor: Koichi Sato, Saitama (JP)

(73) Assignee: PENTAX Corporation, Tokyo (JP)

( * ) Notice: Subject to any disclaimer, the term of this patent is extended or adjusted under 35 U.S.C. 154(b) by 731 days.

(21) Appl. No.: 09/861,564

(22) Filed: May 22, 2001

(65) Prior Publication Data

US 2002/0008769 A1 Jan. 24, 2002

(30) Foreign Application Priority Data

May 23, 2000 (JP) .................................... P2000-150910

(51) Int. Cl.⁷ ............................................ H04N 5/225
(52) U.S. Cl. ............................. 348/207.2; 348/333.05
(58) Field of Search .............................. 348/207.2, 96, 348/333.05, 333.02, 333.11, 207.999; 382/305; 358/403; 386/124

(56) References Cited

U.S. PATENT DOCUMENTS

| | | | | |
|---|---|---|---|---|
| 5,706,457 A | * | 1/1998 | Dwyer et al. ................ | 345/835 |
| 5,796,428 A | * | 8/1998 | Matsumoto et al. ... | 348/207.99 |
| 5,966,122 A | * | 10/1999 | Itoh ........................... | 345/838 |
| 6,408,301 B1 | * | 6/2002 | Patton et al. ................ | 707/102 |
| 6,515,704 B1 | * | 2/2003 | Sato ....................... | 348/333.11 |
| 6,628,333 B1 | * | 9/2003 | Gowda et al. ......... | 348/333.11 |
| 2001/0019656 A1 | * | 9/2001 | Ohmura et al. ............. | 386/117 |
| 2002/0048455 A1 | * | 4/2002 | Tamura et al. ................ | 396/18 |
| 2002/0145633 A1 | * | 10/2002 | Ohmura ....................... | 345/838 |
| 2003/0122935 A1 | * | 7/2003 | Shiohara .................. | 348/207.2 |
| 2003/0151668 A1 | * | 8/2003 | Hatakenaka et al. ..... | 348/207.2 |

* cited by examiner

*Primary Examiner*—Aung Moe
(74) *Attorney, Agent, or Firm*—Greenblum & Bernstein, P.L.C.

(57) ABSTRACT

A continual-image processing device comprises a liquid crystal display panel, on which an image read from a PC card is displayed. By operating a jog dial, the displayed image can be changed and selected as the image to be printed. When continual photographing data is contained in a continual-image flag attached to the image, it is determined that the image was obtained by a continual photographing operation. When the image is obtained by the continual photographing operation, other images having the same continual-image flag are selected, and pixels are thinned from the image data of each selected image, so that the thinned image data are stored in a memory. The series of images obtained by the continual photographing operation are displayed on a liquid crystal display device in a form of a multi frame.

5 Claims, 4 Drawing Sheets

YEAR 2000
February 4
08:45:33
250msec
fifth frame (A2) S 0 0 0 2 0 4 0 8 4 5 3 3 0 0 0 0 0 1

CONTINUAL-IMAGE PROCESSING DEVICE FOR PRINTING OR DISPLAYING IMAGES

BACKGROUND OF THE INVENTION

1. Field of the Invention

The present invention relates to an electronic still camera able to perform a continual photographing operation, and more particularly to a device provided in the electronic still camera to print or display a plurality of images obtained in the continual photographing operation.

2. Description of the Related Art

An electronic still camera is usually provided with a monitor device, such as a liquid crystal display, which can be directly connected to a printer or indirectly through a personal computer, and which can display an image obtained as a photograph. Conventionally, there is known an electronic still camera able to perform a continual photographing operation. Images, obtained in the continual photographing operation, can be printed by a printer or displayed by the monitor device in a way similar to those obtained in a normal photographing operation or by a single shot.

The printer connected to the conventional electronic still camera is configured in such a manner that a single image is printed on a sheet of printing paper, regardless of whether the printed image has been obtained in a continual photographing operation or by a single shot. Accordingly, an effect of the continual photographing operation is not easily recognized by the operator. If an attempt is made to print a plurality of images obtained by the continual photographing operation on a sheet of printing paper, an operation must be performed in which the plurality of images are arranged on a screen of a display device. This operation requires skill and is cumbersome.

SUMMARY OF THE INVENTION

Therefore, an object of the present invention is to provide a continual-image processing device by which a series of images obtained by a continual photographing operation are printed or displayed in such a manner that the effect of the continual photographing operation is fully shown.

According to the present invention, there is provided a continual-image processing device comprising a continual-image determination processor and an image printing processor.

The continual-image determination processor determines whether an image is obtained in a continual photographing operation. The image printing processor prints an image on a sheet of printing paper. When it is determined by the continual-image determination processor that a series of images were obtained in the continual photographing operation, the image printing processor prints the series of images on the sheet of printing paper in such a manner that the series of images are arranged in the order in which the series of images were continually photographed.

Furthermore, according to the present invention, there is provided a continual-image processing device comprising a continual-image determination processor and an image displaying processor.

The continual-image determination processor determines whether an image is obtained in a continual photographing operation. The image displaying processor displays an image on the screen. When it is determined by the continual-image determination processor that a series of images were obtained in the continual photographing operation, the image displaying processor displays the series of images on the screen in such a manner that the series of images are arranged in the order in which the series of images were continually photographed.

BRIEF DESCRIPTION OF THE DRAWINGS

The objects and advantages of the present invention will be better understood from the following description, with reference to the accompanying drawings in which:

FIG. 4 is a view showing examples of a continual-image flag.

DESCRIPTION OF THE PREFERRED EMBODIMENTS

Figure 1:
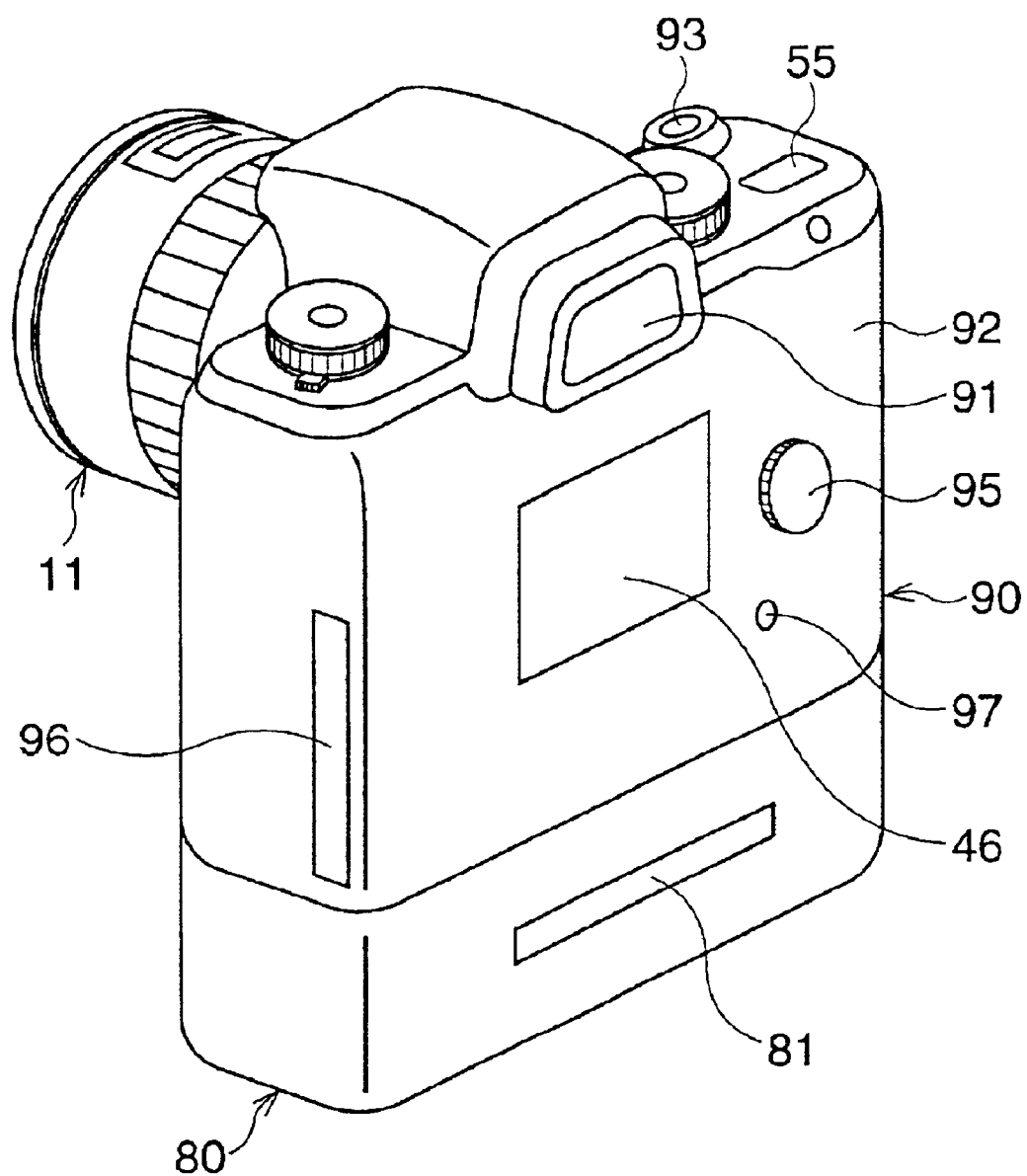
FIG. 1 is a perspective view of an electronic still camera viewed from the back, the camera being provided with a continual-image processing device of an embodiment of the present invention.

The present invention will be described below with reference to the embodiments shown in the drawings.

FIG. 1 is a perspective view of an electronic still camera viewed from the back, the camera having a continual-image processing device of an embodiment of the present invention.

The electronic still camera is a single-lens reflex camera, and an interchangeable lens 11, which is the photographing optical system, is detachably connected to the camera body 90. An optical viewfinder 91 is provided on the center of the upper surface of the camera body 90. A liquid crystal display panel 46 is provided at the center of the rear surface 92 of the camera body 90. Thus, a moving image obtained by the interchangeable lens 11, and a still image corresponding to image data stored in a memory (not shown) by a photographing operation, can be displayed on the liquid crystal panel 46. A multifunctional jog dial 95 is disposed beside the liquid crystal display panel 46. The multifunctional jog dial 95 is provided for setting various kinds of operation modes and performing an image handling described later, and further can be operated by a pressure on the jog dial.

When viewing the camera body 90 from the upper side of the rear surface 92, a shutter button 93 and a condition indicating device 55 are provided on an upper-right portion of the camera body 90. The condition indicating device 55 includes a liquid crystal display panel, by which various kinds of setting conditions of the electronic still camera are indicated by characters or symbols.

A card slot 96 is formed in a side surface of the camera body 90. The card slot 96 is provided for inserting a PC or memory card into the camera body 90, and a card connector (not shown), to which the PC card is attached, is provided within the card slot 96.

A printer unit 80 is detachably connected to an under surface of the camera body 90. A printing head, a printing paper holding mechanism, and a printing operation control circuit, which are not shown, are provided in the printer unit 80. A printing paper eject slot 81 for ejecting printed paper is formed in the rear surface of the printer unit 80. A printing operation of the printer unit 80 is performed by pressing a print start switch 97 provided on the rear surface of the camera body 90.

Figure 2:
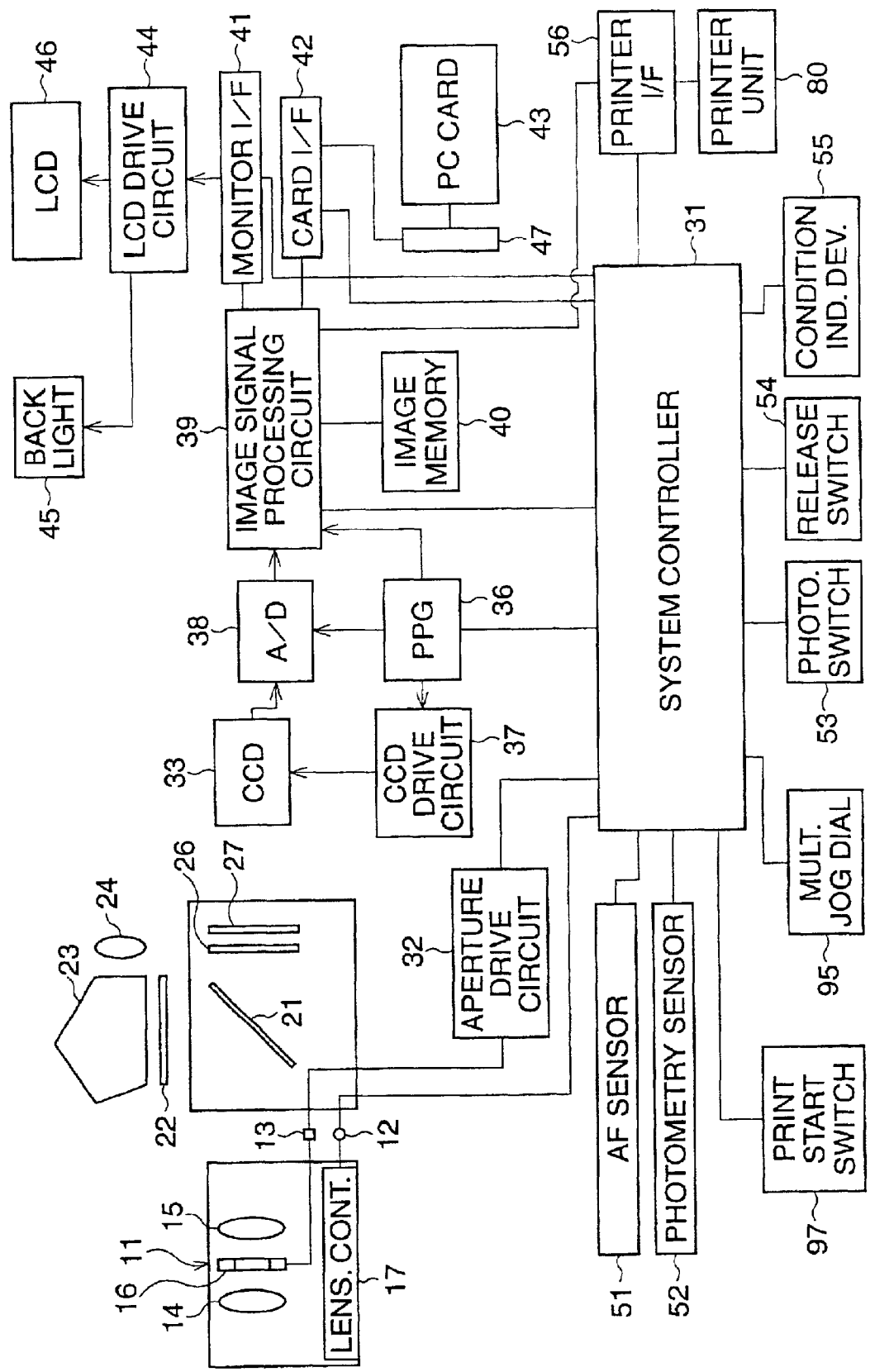
FIG. 2 is a block diagram of the electronic still camera, which shows mainly an electrical construction.

FIG. 2 is a block diagram of the electronic still camera, showing mainly an electrical construction.

The interchangeable lens 11 is electrically connected to an electric circuit provided in the camera body 90 (see FIG. 1) through mount pins 12 and 13. A front lens group 14 and a rear lens group 15 are mounted in a lens barrel of the interchangeable lens 11, and an aperture 16 is provided between the lens groups 14 and 15. Each of the lens groups 14 and 15 is displaced in the optical axis direction under the control of a lens control circuit 17, so that a focusing operation can be carried out. The lens control circuit 17 is operated in accordance with a control signal transmitted through the mount pin 12 from the system controller 31 provided in the camera body. The aperture 16 is operated in accordance with a control signal transmitted through the mount pin 13 from an aperture drive circuit 32 provided in the camera body, so that the degree of opening of the aperture 16 can be adjusted. The operation of the aperture drive circuit 32 is controlled by the system controller 31.

In the camera body 90, a half-mirror 21 is disposed on the optical axis of the lens groups 14 and 15. The half-mirror 21 is fixed at a position inclined by approximately 45 degrees relative to the optical axis of the lens groups 14 and 15. A focusing glass 22 is provided above the half-mirror 21 and a pentagonal prism 23 is arranged above the focusing glass 22. An eyepiece lens 24 of a viewfinder is disposed behind the pentagonal prism 23. Therefore, light passing through the lens groups 14 and 15 is reflected by the half-mirror 21 and lead onto the pentagonal prism 23, and thus the object image can be observed through the eyepiece 24.

An infrared cut filter 26 and an optical low-pass filter 27 are arranged behind the half-mirror 21. A CCD (i.e., an imaging device) 33 is provided behind the optical low-pass filter 27. Therefore, light passing through the lens groups 14 and 15 is transmitted through the half-mirror 21 and the filters 26 and 27, and is radiated onto a light receiving surface of the CCD 33. Namely, the image obtained through the lens groups 14 and 15 is formed on the light receiving surface, and thus, an image signal corresponding to the object image is generated in the CCD 33.

A pulse pattern generator (PPG) 36 is connected to the system controller 31 and generates various kinds of pulse signals under the control of the system controller 31. Based on these pulse signals, the CCD drive circuit 37, an A/D converter 38 and an image signal processing circuit 39 are driven. The operation of the CCD 33 is controlled by the CCD drive circuit 37. Namely, the image signal read from the CCD 33 is converted to digital image data by the A/D converter 38, and is then subjected to a predetermined process by the image signal processing circuit 39. An image memory 40, having a capacity large enough to store frames of digital image data, is connected to the image signal processing circuit 39.

A monitor interface 41 and a card interface 42 are connected to the image signal processing circuit 39. These interfaces 41 and 42 are controlled by the system controller 31. A backlight 45 and the liquid crystal display panel (LCD) 46 are connected to the monitor interface 41 through a liquid crystal display drive circuit 44. Control of the liquid crystal display drive circuit 44 is based on the image signal read from the CCD 33, so that a moving image obtained by the interchangeable lens 11 is displayed on the liquid crystal display panel 46, as described above. Alternatively, based on the image data transmitted to a buffer memory (not shown) from the PC card 43, the liquid crystal display drive circuit 44 is controlled so that a still image is displayed on the liquid crystal display panel 46. A card connector 47 is connected to the card interface 42, and a PC card 43 is attached to the card connector 47.

An AF sensor 51 and a photometry sensor 52 are connected to the system controller 31. The AF sensor 51 has a known construction, by which the focusing condition of the lens groups 14 and 15 is sensed. A photometry operation is performed using the photometry sensor 52, so that the degree of opening of the aperture 16 for the exposure and an electric charge accumulation period (i.e., an exposure period) of the CCD 33 are determined.

The photometry switch 53, the release switch 54 and the condition indicating device 55 are connected to the system controller 31. The photometry switch 53 is turned ON by partly depressing the shutter button 93 so that a photometric operation is carried out by the photometry sensor 52. The release switch 54 is turned ON by fully depressing the shutter button 93, so that the CCD 33 is exposed, and thus an image signal corresponding to the object image is generated in the CCD 33.

The multifunctional jog dial 95 is connected to the system controller 31. The multifunctional jog dial 95 is rotated and set to a rotational position, and is depressed while maintaining the set position, so that the operation mode is determined. The operation mode includes a continual photographing mode, in which a plurality of images are recorded at a predetermined interval.

A printer interface 56 and the print start switch 97 are connected to the system controller 31. The printer interface 56 is also connected to the image signal processing circuit 39 and a printing operation control circuit (not shown) provided in the printer unit 80. When the print start switch 97 is depressed, image data is read from the image memory 40, subjected to a predetermined process in the image signal processing circuit 39, and transmitted to the printer unit 80 through the printer interface 56. The printer unit 80 then carries out a printing operation in accordance with the transmitted image data.

Figure 3:
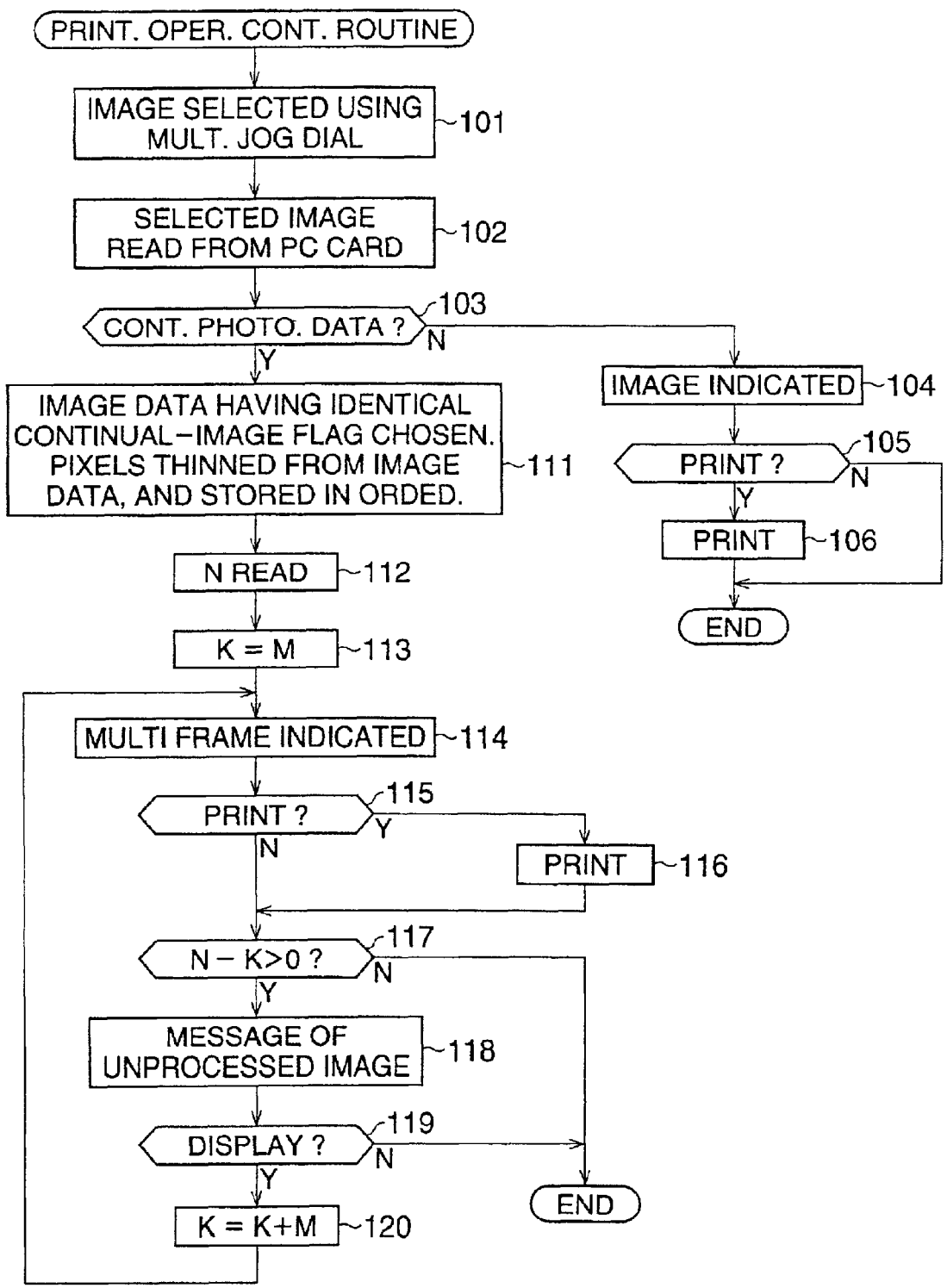
FIG. 3 is a flow chart of a printing operation control routine.

FIG. 3 is a flow chart of a printing operation control routine, which is a program for carrying out a printing operation. The printing operation control routine is executed in the system controller 31, in a form of an interrupt handling when depressing the print start switch 97, for example.

In Step 101, image data of an image, which was recorded last among all images recorded in the PC card 43, and the ID data corresponding to the image data are read from the PC card 43. A thumbnail image (i.e., a reduced image) is then generated based on the read image data, and image-related information is generated based on photographing time information, which is contained in the ID data, and a frame number, which is a serial number of each of the images recorded in the PC card 43. Then the thumbnail image and the image-related information are displayed on the liquid crystal display panel 46. When the multifunctional jog dial 95 is operated by the user, the frame number indicated on the panel 46 is changed one by one, so that the image data and the ID data corresponding to the frame number are read from the PC card 43. Thus, the thumbnail image and the image-related information, indicated on the liquid crystal display panel 46, are changed. When the multifunctional jog dial 95 is depressed by the user while the desired image is indicated, the image is selected as an image to be printed.

In Step 102, the image data and the ID data corresponding to the image selected in Step 101 are read from the PC card 43. In Step 103, it is determined whether continual photographing data is contained in a continual-image flag included in the ID data, or whether the image was obtained in a continual photographing operation. The continual-image flag is recorded in the PC card 43 at every photographing operation, including a single shot. The continual photographing data is recorded as a part of the continual-image flag in the continual photographing operation. When there is no continual photographing data, the process goes to Step 104, and when there is a continual photographing data, the process goes to Step 111.

In Step 104, an image obtained by a single shot is displayed on the liquid crystal display panel 46, based on the image data read in Step 102. In Step 105, a message, asking whether or not a printing operation is to be carried out, is indicated on the condition indicating device 55, and when the print start switch 97 is depressed once, Step 106 is executed so that a printing operation is performed, and this routine ends. Conversely, when the print start switch 97 is depressed twice for a short period of time (1 sec, for example), Step 106 is skipped, and this routine ends without executing the printing operation.

In Step 111, image data having the identical continual-image flag are chosen. The identical continual-image flag is attached to a plurality of image data obtained by a single continual photographing operation, and in Step 111, images obtained by the single continual photographing operation are extracted based on the continual-image flag. Then, pixels are thinned from each of the image data in accordance with a multi frame number M, which is set beforehand, and the thinned image data are stored in the memory 40 while being arranged in the order in which the images were photographed. For example, when (3×3) images are displayed on the liquid crystal display panel 46, the multi frame number M is 9, and in Step 111, the pixels are thinned such that a single image becomes the size of ($\frac{1}{3}$)×($\frac{1}{3}$) of the original image.

In Step 112, the number of continual photographed image (s) N is read based on the continual-image flag. In Step 113, the multi frame number M is set as the initial value of a counter K. The multi frame number M is 9 or 16, for example. When the multi frame number M is 9, (3×3) images are displayed on a screen of the liquid crystal display panel 46, and when the multi frame number M is 16, (4×4) images are displayed on the screen. In Step 114, the image data of a series of images obtained by the single continual photographing operation are read from the memory 40, and the images are displayed on the liquid crystal display panel 46 in a form of a multi frame, in which the images are arranged in the order in which the images were continually photographed. When the multi frame number M is 9 and the number of images obtained by the continual photographing operation is less than 9, all of the images are displayed on the liquid crystal display panel 46. Conversely, when the number of images obtained by the continual photographing operation is more than 9, the first 9 images are displayed on the liquid crystal display panel 46 and the remaining images are not displayed.

In Step 115, in a similar way to Step 105, a message, asking whether or not a printing operation is to be carried out, is displayed on the condition indicating device 55. When the print start switch 97 is depressed once, a printing operation is performed in Step 116, and when the print start switch 97 is depressed twice for a short period of time (1 sec, for example), Step 116 is skipped, so that the printing operation is not executed. In the printing operation of Step 116, the image data are read from the memory 40, so that the series of images are simultaneously printed on a sheet of paper in such a manner that the images are arranged in a way similar to that of Step 114, i.e., in the order in which the images are continually photographed.

After the execution of Step 115 or Step 116, Step 117 is executed, in which the difference (N−K) between the number of continual photographed images N and the counter K is greater than 0. It is assumed that the number of continual photographed image N is 5 and the multi frame number M is 9. When Step 117 is executed for the first time, the difference (N−K) is equal to −4, and all of the images obtained by the continual photographing operation have been displayed and printed. In this case, this routine ends when Step 117 is executed.

Conversely, in a case in which the number of continual photographed images N is 15 and the multi frame number M is 9, when Step 117 is executed for the first time, the difference (N−K) is equal to 6, and this denotes that six images, included in the images obtained by the continual photographing operation, have not been displayed and printed. In this case, Step 118 is executed, in which a message, showing that there are still some images which have not been displayed or printed, is displayed on the condition indicating device 55. In Step 119, a message, asking whether or not the unprocessed images are to be displayed, is displayed on the condition indicating device 55. Under this condition, when the print start switch 97 is depressed once by the user, the process goes to Step 120, in which the multi frame number M is added to the counter K, and the process goes back to Step 114. For example, when the counter K is 9 and the multi frame number M is 9, the value of the counter K is 18, images including the tenth image and the following images are displayed in Step 114. Conversely, when the print start switch 97 is depressed twice for a short time (1 sec, for example), this routine ends. Thus, in Step 119, the print start switch 97 is used for controlling the indicating operation of the condition indicating device 55.

Thus, when the number of images obtained by the continual photographing operation exceeds the multi frame number M, all of the images are printed separately in a plurality sheets of printing paper, or displayed in a plurality times. In other words, the excessive images are printed on a further sheet of printing paper, or are displayed on the screen at a different timing to that at which the predetermined number of images are displayed.

As the continual-image flag, various forms can be adopted. FIG. 4 shows examples of the continual-image flag. Reference A1 depicts an example of a continual photographing operation and reference A2 depicts an example of a single shot.

In each example, data "C" of the most significant bit means the continual photographing operation, and data "S" of the most significant bit means the single shot. Namely, "C" is the continual photographing data. "00" of the second and third significant bits mean that the photography was carried out in the year 2000. The fourth through seventh significant bits mean that the date of photography was February 4 (i.e., 02/04), and the eighth through thirteenth significant bits mean that the time of photography was 8:45:33. Note that the time of photography in the example A1 is that of the first frame. Namely, "084533" is a time at which the first image is taken or photographed in a continual photographing operation. The fourteenth through seventeenth significant bits mean that the interval time of the continual photographing operation is 250 msec in the first example A1. These are set to "0000" in the second example A2, since there is no interval time. The two least significant bits indicate the fifth frame of the continual photographing operation in the first example A1, and are set to "01" in the second example A2.

According to the embodiment as described above, when an image selected from thumbnail images is obtained by the continual photographing operation, a series of images including the selected image, which were obtained by the continual photographing operation, are displayed on the liquid crystal display panel 46 or printed on a sheet of printing paper in such a manner that the images are arranged in the order in which the images were obtained in the continual photographing operation. Therefore, the effect of the continual photographing operation can be easily recognized by the user, and further, a particular operation for printing the plurality of images, obtained by the continual photographing operation, on a sheet of printing paper, or for arranging the plurality of images on a screen of a display device, is not needed.

Note that, although the present invention is applied to an electronic still camera in each of the above embodiments, the present invention can be applied to an image processing device such as a computer.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-150910 (filed on May 23, 2000) which is expressly incorporated herein, by reference, in its entirety.

What is claimed is:

1. A continual-image processing device comprising:

a continual-image determination processor that determines whether an image is obtained in a continual photographing operation;

an image printing processor that prints an image on a sheet of printing paper, when it is determined by said continual-image determination processor that a series of images were obtained in said continual photographing operation, said image printing processor printing said series of images on said sheet of printing paper in such a manner that said series of images are arranged in an order in which said series of images were continually photographed; and an image display processor that displays said series of images on a screen in such a manner that said series of images are arranged in the order in which said series of images were continually photographed, said image display processor configured to display a predetermined number of images simultaneously, and when the number of images obtained by said continual photographing operation exceeds said predetermined number, said image display processor displays the excessive images on the screen at a different timing to that at which said predetermined number of images are displayed.

2. A device according to claim 1, wherein said image printing processor can print a predetermined number of images on said sheet of printing paper, and when the number of images obtained by said continual photographing operation exceeds said predetermined number, said image printing processor prints excessive images on a further sheet of printing paper.

3. A device according to claim 1, further comprising an image selecting processor that displays at least one image of all images recorded in a recording medium, as a thumbnail image, together with image information corresponding to said thumbnail image, on said screen, and selects an image, which is to be printed, based on the contents displayed on said screen.

4. A device according to claim 3, further comprising a continual-image extracting processor that extracts an image from said series of images, and when said continual-image determination processor determines that said image selected by said image selecting processor was obtained by said continual photographing operation, said continual-image extracting processor extracts the other images obtained by said continual photographing operation.

5. A continual-image processing device comprising:

a continual-image determination processor that determines whether an image is obtained in a continual photographing operation; and an image displaying processor that displays an image on a screen, when it is determined by said continual-image determination processor that a series of images were obtained in said continual photographing operation, said image displaying processor displaying said series of images on the screen in such a manner that said series of images are arranged in an order in which said series of images were continually photographed, wherein said image displaying processor can display a predetermined number of images simultaneously, and when the number of images obtained by said continual photographing operation exceeds said predetermined number, said image displaying processor displays the excessive images on the screen at a different timing to that at which said predetermined number of images are displayed.

* * * * *